United States Patent [19]

Bush et al.

[11] 4,454,574
[45] Jun. 12, 1984

[54] PUSH-PULL STORED CHARGE INVERTER CIRCUIT WITH RAPID SWITCHING

[75] Inventors: Alvin A. Bush; John Giorgis, Jr.; Thomas E. Anderson, all of South Euclid, Ohio

[73] Assignee: General Electric Company, Schenectady, N.Y.

[21] Appl. No.: 328,780

[22] Filed: Dec. 9, 1981

[51] Int. Cl.³ .......................................... H02M 7/537
[52] U.S. Cl. ...................................... 363/134; 363/97; 323/289
[58] Field of Search .................. 363/133, 134, 97, 56, 363/24–26, 22–23; 323/289; 307/300

[56] References Cited

U.S. PATENT DOCUMENTS

| | | | |
|---|---|---|---|
| 3,601,682 | 8/1971 | Iwata | 363/133 |
| 3,629,725 | 12/1971 | Chun | 323/289 X |
| 3,662,249 | 5/1972 | Wijsboom | 323/289 X |
| 3,696,285 | 10/1972 | Saia | 363/22 X |
| 3,781,638 | 12/1973 | Anderson et al. | 363/56 |
| 3,962,626 | 6/1976 | Cardwell | 363/134 |

OTHER PUBLICATIONS

Chen et al., "Application of Transistor Emitter-Open Turn-Off Scheme to High Voltage Power Inverters" PESC '81 IEEE, Boulder, Co., Jun. 29-Jul. 3, 1981, pp. 252-257.

Primary Examiner—Peter S. Wong
Attorney, Agent, or Firm—Philip L. Schlamp; Fred Jacob

[57] ABSTRACT

A push-pull inverter circuit for an inductive load such as a fluorescent lamp. A pair of transistors alternately and repetitively apply energy to the load, and are alternately rendered conductive by stored charges produced by flyback induced voltage in the load, in cooperation with a single mutual control circuit which repetitively renders the push-pull transistors nonconductive and removes their stored charges.

12 Claims, 4 Drawing Figures 4,454,574

PUSH-PULL STORED CHARGE INVERTER CIRCUIT WITH RAPID SWITCHING

CROSS-REFERENCE TO RELATED APPLICATIONS

Ser. No. 472,681, filed Mar. 7, 1983, Thomas E. Anderson et al, "Stored Charge Inverter Circuit", assigned the same as this invention, a continuation-in-part of Ser. No. 184,648, filed Sept. 5, 1980, Thomas E. Anderson et al, "Stored Charge Inverter Circuit", assigned the same as this invention.

Ser. No. 284,016, filed July 16, 1981, Thomas E. Anderson et al, "Stored Charge Inverter Circuit with Rapid Switching", assigned the same as this invention now U.S. Pat. No. 4,408,270, issued Oct. 4, 1983.

BACKGROUND OF THE INVENTION

The invention is in the field of inverter circuits employing transistors as switches for producing a-c output energy from d-c input energy.

Inverter circuits have been known in various configurations, such as push-pull, full-bridge, and half-bridge. A widely used type of push-pull inverter circuit employs a center-tapped load often in the form of a transformer having a center-tapped primary winding, and a secondary winding connected to a load device such as a lamp or lamps, for example fluorescent lamps, or a motor, induction heater, or other suitable device. A pair of transistor switches are respectively connected to the ends of the primary winding and are controlled to switch current through the halves of the primary winding in an alternating push-pull manner.

The above-referenced patent applications, the disclosures of which are incorporated herein by reference thereto, disclose inverter circuits in which the switching transistors are alternately rendered conductive by stored charges produced therein by flyback induced voltage in the load. FIG. 5 of the second referenced patent application discloses a push-pull stored charge inverter circuit having two individual control circuits for synchronously controlling the switching of the switching transistors.

SUMMARY OF THE INVENTION

Objects of the invention are to provide an improved inverter circuit, and to provide a simplified and economical push-pull stored charge rapid switching inverter circuit that has a single control circuit for synchronously controlling the switching of the switching transistors.

The invention comprises, briefly and in a preferred embodiment, a push-pull stored charge inverter circuit for sn inductive load, the circuit having a pair of transistors connected to alternately and repetitively apply electrical energy to the load, means for rendering the transistors alternately conductive by stored charges produced by flyback induced voltage in the load, said means including a single control circuit connected to periodically render the transistors nonconductive and remove their stored charges.

Figure 1:
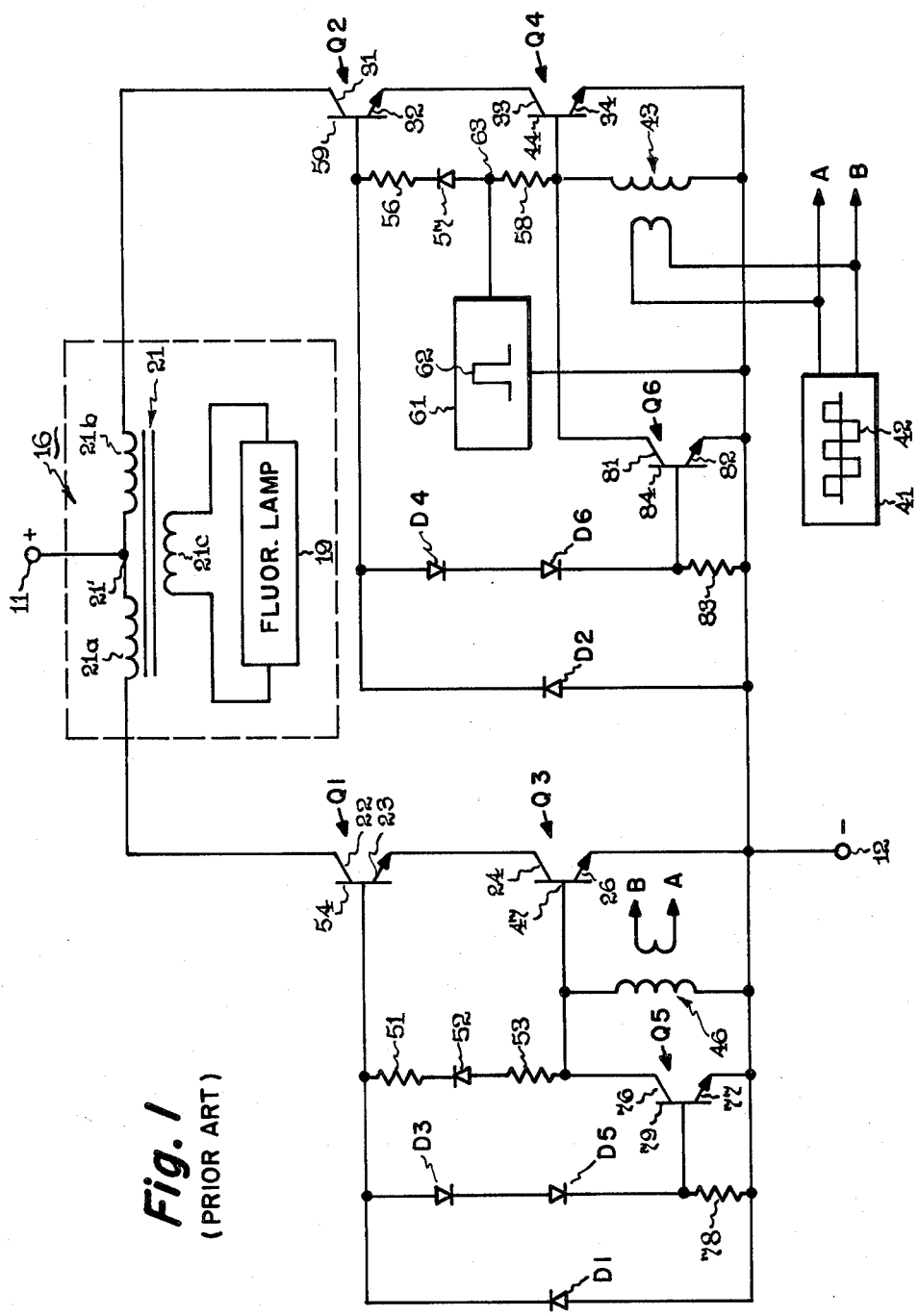
FIG. 1 is a schematic diagram of a prior-art push-pull inverter circuit as disclosed in the second above-referenced patent application, and is a combination of FIGS. 2 and 5 thereof.
Figure 2:
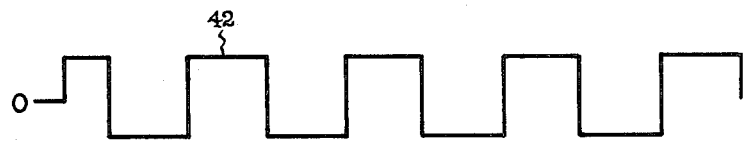
FIG. 2 is a time-plot showing of certain signals, voltage, and current in the circuit of FIG. 1 when operating.
Figure 2:
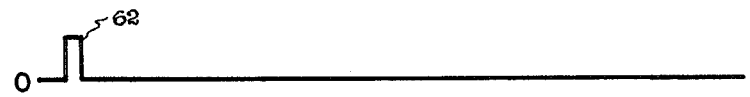
Figure 2:
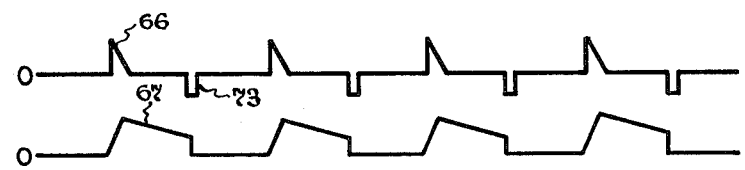
Figure 2:
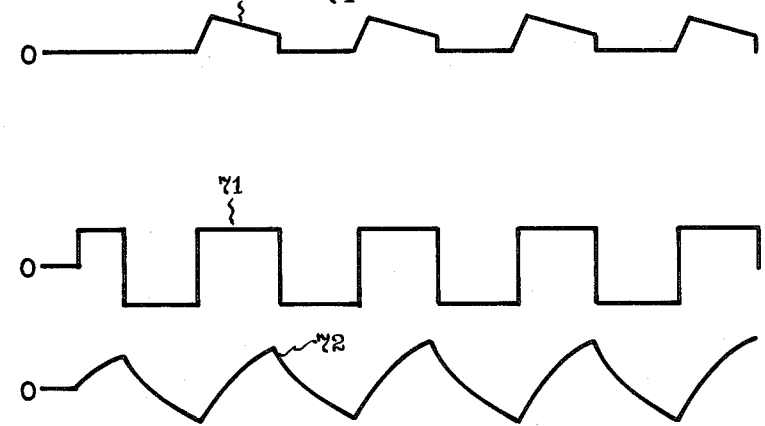

DESCRIPTION OF THE PRIOR ART (FIGS. 1 and 2)

In FIG. 1, d-c electrical power input terminals 11 and 12 receive positive and negative polarity power, respectively from a d-c power source which may be a rectifier type of power supply for deriving d-c power from a household or commercial a-c power source. An inductive load 16 comprises a transformer 21 having a center-tapped primary winding in the form of two primary winding halves 21a, 21b, and having a secondary winding 21c connected to one or more fluorescent lamps 19 or other load device. The center-tap 21' is connected to the positive polarity terminal 11. The load 16 is inductive or has an inductive component, such as a gas discharge lamp, motor, inductive heating unit, etc., and may include a transformer coupling. If the load per se is not inductive, the required inductive component can be provided by a coupling transformer or other suitable means.

A first pair of transistors Q1 and Q3 have their output electrodes connected in series between the outer end of transformer winding 21a and negative power input terminal 12. More specifically, the collector 22 of Q1 is connected to winding 21a, and its emitter 23 is connected to the collector 24 of Q3, of which the emitter 26 is connected to terminal 12. Similarly, a second pair of transistors Q2 and Q4 have their output electrodes connected in series between the outer end of the transformer winding 21b and terminal 12; more specifically, the collector 31 of Q2 is connected to winding 21b and its emitter 32 is connected to the collector 33 of Q4, of which the emitter 34 is connected to terminal 12. Transistors Q3 and Q4 function similarly and are herein designated the "first" transistors of each pair, and transistors Q1 and Q2 function similarly and are herein designated the "second" transistors of each pair.

The output of a source 41 of square wave control voltage or current signal 42, preferably at a frequency of 20 kilohertz or higher, is coupled, via a transformer 43, between the emitter 34 and base 44 of transistor Q4 and also is coupled, via a transformer 46, between the emitter 26 and the base 47 of transistor Q3. The connections to the transformers 43 and 46 are made so that the control voltage 42 is applied to the transistors Q3 and Q4 in opposite phases so as to render them in a condition to be alternately and repetitively conductive; i.e., when Q3 is in condition to be "on", Q4 is "off", and vice versa.

A resistor 56, diode 57, and resistor 58 are connected in series and in the order named between the base 59 of transistor Q2 and base 44 of transistor Q4, the cathode of diode 57 being toward base 59. The output of a source 61 of a single starting pulse 62 is connected to one of the transistors Q1 or Q2; as shown, it is connected to Q2 and more specifically is connected between the emitter 34 of transistor Q4 and the junction 63 of diode 57 and resistor 58. The starting pulse 62 may be synchronized with the control voltage or current 42 so as to render transistor Q2 conductive at a time when Q4 is rendered conductive; thereafter, as will be described, Q2 (and also Q1) are rendered periodically conductive by means of stored charges obtained from flyback current in the load 16. Starting pulse 62 would also render Q4 conductive if the control signal 42 had not commenced. Diode 57 functions to block a flow of current from the base path of Q2 which will be described subsequently. Components 51, 52, and 53, the same as resistors 56, 58 and diode 57, can be provided between base 54 of Q1 and base 47 of Q3 if identical halves of the circuit are desired, for example if they are integrated circuits or if a choice is desired of applying the starting pulse 62 to Q1 or to Q2. A diode D1 is connected between terminal 12 and the base 54 of Q1, with its cathode toward base 54, and a pair of nonlinear devices such as transistors or diodes D3, D5 are connected in series with a resistor 78 between these same points, with their anodes toward base 54. A clamping transistor Q5 is connected across the winding 46, with its collector 76 and emitter 77 respectively connected to the base 47 and emitter 26 of transistor Q3, its base 79 being connected to the junction of resistor 78 and diode D5. Similarly, a diode D2 is connected between voltage input terminal 12 and the base 59 of Q2, with its cathode toward base 59, and a pair of nonlinear devices such as transistors or diodes D4, D6 are connected in series with a resistor 83 between these same points, with their anodes toward base 59. A clamping transistor Q6 is connected across the winding 43, with its collector 81 and emitter 82 respectively connected to the base 44 and emitter 34 of transistor Q4, its base 84 being connected to the junction of resistor 83 and diode D6.

The circuit of FIG. 1 functions as follows, with reference to the electrical waveshapes shown in FIG. 2. The turn-on pulse 62, which may be of shorter time duration than the individual square waves 42, occurs in synchronization with the square waves 42 such as to cause transistor Q2 to turn on and be conductive at the same time Q4 is conductive. The turn-on pulse 62 can be of very short time duration and can terminate prior to termination of the first square wave half-cycle applied to Q4, as is shown in the drawing, because a stored charge is induced in Q2 by the turn-on pulse 62 which maintains Q2 conductive during the time Q4 is conductive, as is more fully disclosed in the first above-referenced patent application. While Q2 and Q4 are thus conductive, current flows from the positive terminal 11 through winding 21b of load 16, and Q2 and Q4 to the negative terminal 12. Upon polarity reversal of the control voltage of the square wave 42, transistor Q3 is rendered in condition to be conductive, and Q4 is rendered nonconductive whereby the current is interrupted in the load 16; however, stored energy in the inductive component of the load produces a "flyback" voltage and current in winding 21b, which induces in winding 21a a voltage of greater negative polarity at collector 22 of Q1 than the negative voltage at terminal 12, causing current to pass through the diode D1 and the base 54 and collector 22 of transistor Q1. This flyback-induced current pulse 66 in base 54 renders transistor Q1 fully conductive. During this time Q1 operates as an inverted transistor where the base-collector junction becomes the emitter and the base-emitter junction becomes the collector. A charge 67 is stored in Q1 during this time. When the inductive energy has dissipated the stored charge keeps the transistor Q1 conductive, so that current now flows from terminal 11 through the load winding 21a and transistors Q1, Q3, to terminal 12, the current in the load being 180 degrees out of phase to that of current flow when transistors Q2 and Q4 conduct. The stored charge 67 partly drains off, as shown by curve 67; however, the frequency of the square wave control signal is chosen sufficiently high (20 kilohertz, for example) so that the stored charge is effective in maintaining conduction of the transistor during the half cycle of the square wave. When the square wave 42 next renders transistors Q3 and Q1 nonconductive, and terminates the load current, stored energy induced in the inductive component of the load winding 21b produces a flyback voltage and current 68 (of negative polarity) which is conducted through the collector-base junction of transistor Q2, and diode D2, as shown in the drawing, which renders transistor Q2 again conductive, operating in an inverted mode, and creates a stored charge 69 in the transistor which maintains the transistor in a fully conductive state until the next half-cycle of the square wave. The process is repetitive and applies a square wave of voltage 71 at the load 16 which causes an alternating current 72 to flow in the load device 19.

Transistors do not tend to turn on and off instantly; there is a certain time required, for example a few microseconds or milliseconds, for changing from nonconduction to full conduction, and vice versa. Transistor turn-off time tends to be slowed due to the above-described stored charge tending to keep it conductive. The circuit minimizes this problem by connecting the diodes D3, D5 and D4, D6 to the bases of transistors Q1 and Q2, respectively, and by opening the emitter current paths of Q1 and Q2 by means of the switching control transistors Q3 and Q4. Assume that Q1 and Q3 are conducting during a half cycle of circuit operation, whereupon the control voltage 42 drives the base 47 of Q3 negative, to turn off Q3. As Q3 is turning off, its current diminishes and its collector-to-emitter impedance increases, causing the voltage of the electrodes of Q1 to rise toward the positive voltage at terminal 11; when the rising voltage at the base 54 reaches the turn-on conduction level of diodes D3 and D5 they become conductive and divert Q1 current through the base 54 as shown by curve 73. This current 73 flows from terminal 11 through winding 21a the collector-base path 22, 54 of Q1, the diodes D3, D5, and resistor 78 in parallel with the base-emitter of Q5 to terminal 12. This surge of negative base current quickly "dumps" the residual stored charge out of the base 54 of Q1, as indicated by numeral 67 in FIG. 2 whereby Q1 turns off very rapidly. During this "dumping" action, the entire collector 22 current flows through base 54 and none flows through emitter 23, which aids in speeding the turn-off of Q1. This current flow ceases upon depletion of the stored charge. When Q1 is fully off, the pair of transistors Q1, Q3 is fully off. Similarly, when Q4 is being turned off, its collector-to-emitter impedance increases, causing the voltage of the electrodes of Q2 to rise toward the voltage of terminal 11, and the diodes D4, D6 become conductive and a surge of current 74 flows through the collector-base path 31, 59 and quickly "dumps" the residual stored charge, as indicated by numeral 69 in FIG. 2, thereby Q2 turns off very rapidly and terminates the current flow through the pair of transistors Q2, Q4. The "dumping" current pulses 73, 74 last a very short time, such as about one microsecond. The number of diodes D3, D5 and D4, D6 employed in series depends on the desired turn-on point for the stored charge dumping action.

The just described rapid turn-off switching helps insure that both transistors of a pair are turned off (or at least one of the transistors is turned off) by the time the other pair of transistors is turned on for the next half-cycle of operation. The clamping transistors Q5 and Q6 function as follows. During the aforesaid times when the stored charges are being "dumped" from base 54 of Q1, the bias voltage across resistor 78 renders Q5 conductive and its collector 76 and emitter 77 clamp across base 47 and emitter 26 of Q3 to insure its complete turn-off and preventing it from undesirably becoming conductive or partly conductive in the event of a spurious transient voltage spike in the control signal 42. Q6 functions similarly when stored charges are dumped from base 59 of Q2.

DESCRIPTION OF THE PREFERRED EMBODIMENT

Figure 3:
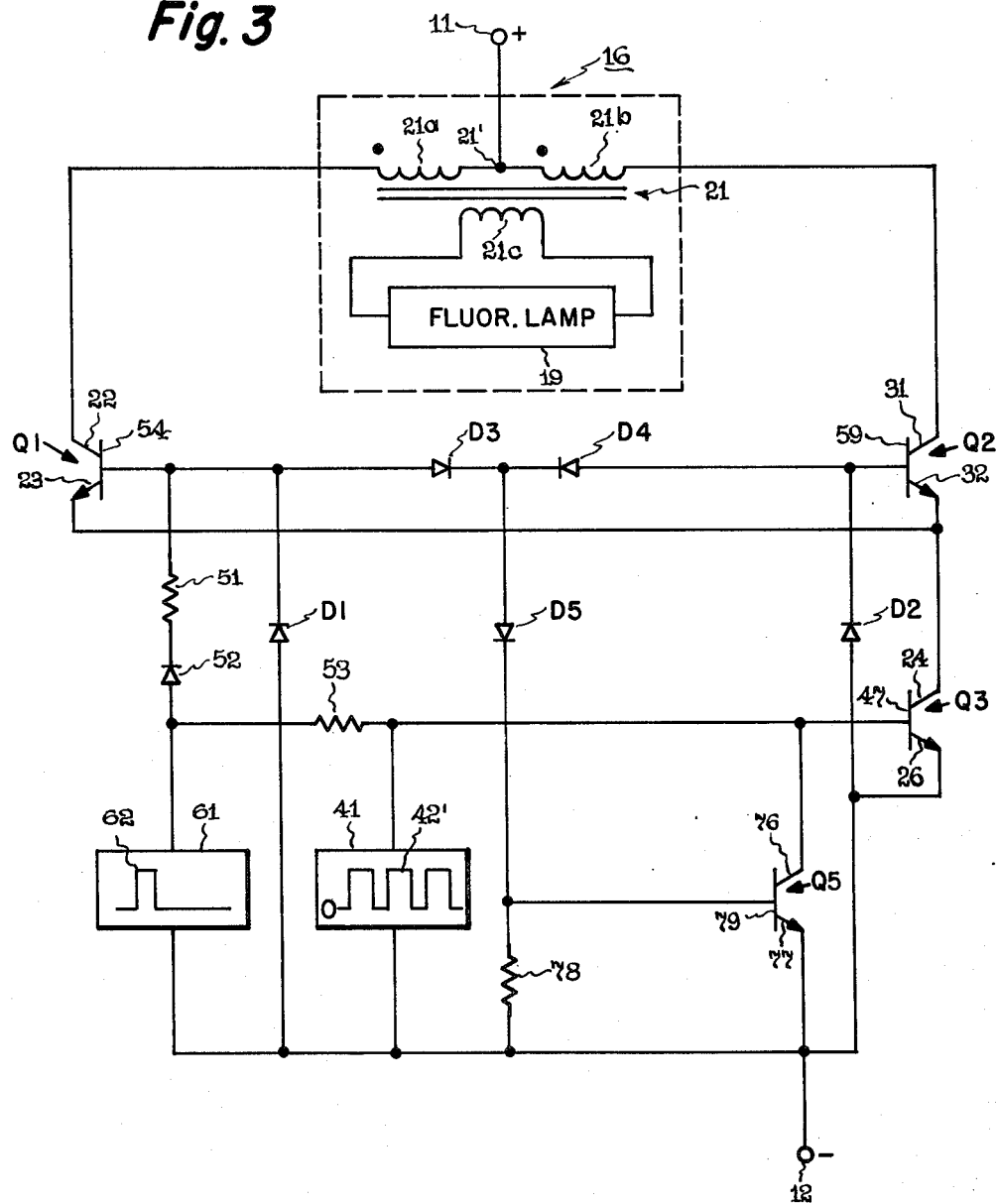
FIG. 3 is a schematic diagram of a preferred embodiment of the invention.

The preferred circuit of the invention, shown in FIG. 3, is a simplified and more economical push-pull inverter than that of FIG. 1, and it employs a single control circuit for controlling both of the push-pull switching transistors Q1 and Q2, thus eliminating two transistors (Q4 and Q6) and transformers 43, 46, and other components required in FIG. 1. The control signal 42' of FIG. 3 has a different waveshape than that of control signal 42 in FIG. 1, as will be described. The circuit components in FIG. 3 which are the same or equivalent to those in FIG. 1, are numbered the same as in FIG. 1.

In FIG. 3, the load 16, including load transformer 21 and load device 19, is shown the same as in FIG. 1. Transistors Q1 and Q3 have their collector-emitter output electrodes connected in series between the end of load winding half 21a and the negative power terminal 12, as in FIG. 1. Transistor Q2 has its collector 31 connected to the end of transformer winding half 21b, and, unlike FIG. 1, has its emitter 32 connected jointly to the collector 24 of transistor Q3 and the emitter 23 of transistor Q1. Diodes D1 and D2, for providing stored-charge current paths, are respectively connected between the base electrodes of transistors Q1 and Q2 and the negative power terminal 12, as in FIG. 1. A clamping transistor Q5 has a collector 76 connected to the base 47 of Q3, and an emitter 77 connected to the negative power terminal 12. Diodes D3, D4 are connected in series opposition between the base electrodes 54, 59 of Q1 and Q2, and a diode D5 and resistor 78 are connected between the junction of diodes D3, D4 and the negative power terminal 12, as shown, the diodes D3, D4 and D5 being oriented with their cathodes toward the terminal 12. The base electrode 79 of transistor Q5 is connected to the junction of diode D5 and resistor 78.

A source 41 of control voltage signal 42' is connected between the base electrode 47 of transistor Q3 and the negative power terminal 12. A resistor 51, diode 52, and resistor 53 are connected in the named order between the base 54 of transistor Q1 and the base 47 of transistor Q3, the cathode of diode 52 being toward base 54. The source 61 of a starting pulse 62 is connected between the junction of diode 52 and resistor 53, and the negative power terminal 12.

Figure 4:
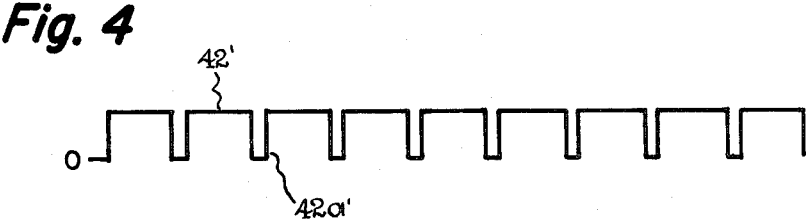
FIG. 4 is a time-plot showing of certain signals, voltage, and current in the circuit of FIG. 3 when operating.
Figure 4:
Figure 4:
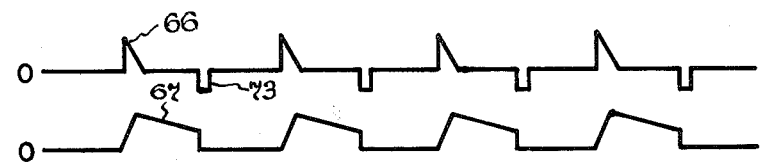
Figure 4:
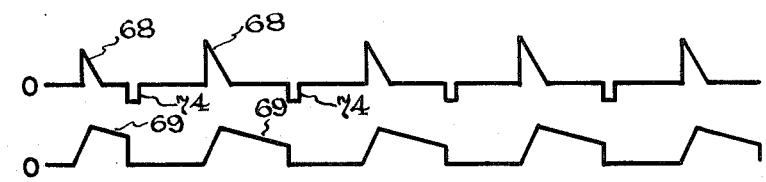
Figure 4:
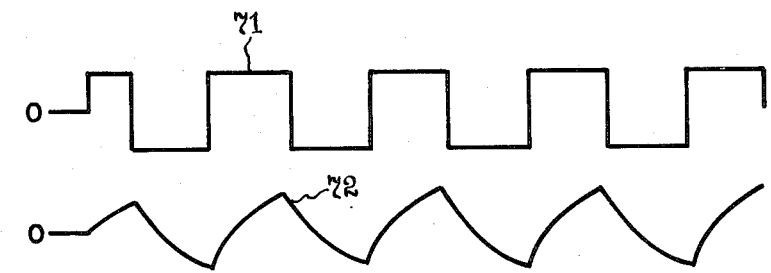

The circuit of FIG. 3 functions as follows, with reference to the electrical waveshapes shown in FIG. 4. The switching transistors Q1 and Q2 are rendered conductive alternately and repetitively, and control transistor Q3 is conductive during each conductive period of Q1 and of Q2, as will be described. During the half cycles of operation when Q1 and Q3 are conductive, current flows through the primary winding half 21a, and during the alternate half cycles when Q2 and Q3 are conductive, current flows through the primary winding half 21b, resulting in a continuous series of full cycles of load voltage 71 and lamp current 72 as shown in FIG. 4. The control signal 42' is in the form of square (or rectangular) waveshapes of positive polarity separated by short "off" or low voltage periods 42a' which may be as short as a few microseconds. If the control signal 42' has a cyclic frequency of 40 kHz, the load voltage 71 and current 72 will have a cyclic frequency of 20 kHz.

In starting the circuit operation, the control signal 42' renders the control transistor Q3 repetitively conductive, with short "off" time periods 42a'; however, the switching transistors Q1, Q2 are both nonconductive, due to lack of positive polarity base voltage, until the starting pulse 62 is applied to one of these bases, for example to the base 54 of Q1 injecting current 68 to form a stored charge 69 therein, whereupon Q1 becomes conductive and current flows from terminal 11 through the transformer winding 21a and transistors Q1, Q3 to terminal 12. This current flows until the next "off" period 42a' of control signal 42', whereupon Q3 is turned off for a short moment to interrupt the current flow. While Q3 is thus momentarily off, the voltages at the electrodes of Q1 rise toward the positive potential of terminal 11 and reach the turn-on voltage of diodes D3 and D5, whereby they become conductive and drain or "dump" the stored charge from Q1, through D3, D5, and resistor 78 in parallel with the base-emitter of Q5 as indicated by numeral 74. This dumping current through resistor 78 produces a voltage at the base 79 of clamping transistor Q5 which turns Q5 on so that it clamps Q3 in the off position to prevent it from being turned on by any noise or transient spikes in the control signal 42' during its off period 42a'. The current cessation in winding 21a when Q3 and Q1 are turned off causes an induction voltage "kick" to occur, which is magnetically induced in winding 21b with a negative polarity at collector 31 of Q2 of greater magnitude than that at terminal 12, whereby a pulse of current 66 flows from terminal 12 through diode D2, the base-collector path of Q2, and through winding 21b to the terminal 11, thus forming a stored charge 67 in Q2 for turning it on; at about this time (and before the inductive energy has dissipated) the control signal 42' turns Q3 on again, completing a current path from terminal 11 through winding 21b and Q2, Q3 to terminal 12, thus completing a cycle of alternating voltage 71 and current 72 in the load 16.

Upon the next momentary turn-off 42a' of the control signal 42', Q3 is turned off momentarily, the electrodes of Q2 rise toward the positive potential at terminal 11 and above the turn-on voltage of D4 and D5, and the stored charge in Q2 dumps (numeral 73 in FIG. 4) through the diodes D4, D5 and resistor 78, which renders Q2 in the off condition and turns on the clamping transistor Q5, all as described above for the turning off of Q1. Also, at the same time, the flyback inductive kick in winding 21b induces a voltage pulse in winding 21a which causes a current pulse 68 to flow through the collector-base path of Q1 and diode D1, thus again forming a stored charge 69 in Q1 which keeps it conductive during the next conductive period of Q3, whereupon another cycle of operation commences. Diode D5 may be omitted, and the junction of D3 and D4 connected directly to base 79 of Q5, if diodes D3 and D4 have suitable turn-on voltage characteristics.

The foregoing alternating sequential switching of Q1 and Q2 continues, causing push-pull switching of the load 16, under control of the single control transistor Q3, it being noted that the clamping transistor Q5 is desirable but not mandatory in carrying out the invention.

While preferred embodiments and modifications of the invention have been shown and described, various other embodiments and modifications thereof will become apparent to persons skilled in the art and will fall within the scope of the invention as defined in the following claims.

What we claim as new and desire to secure by United States Letters Patent is:

1. A push-pull inverter circuit comprising a load having an inductive component, a pair of transistors connected to said load for push-pull operation thereof, means for rendering the transistors alternately conductive by stored charges produced by flyback induced voltage in said load, said means including a control circuit for periodically rendering both of said transistors simultaneously incapable of conduction and causing removal of any remnant stored charge therefrom, and means activated by a first one of said pair of transistors being turned off for inducing a voltage in said inductive component of said load to cause an electrical charge to be stored in the other of said pair of transistors to render said other of said transistors conductive; said control circuit further comprising means connected electrically in series with the respective emitters of each transistor of said pair of transistors for causing normal current to flow in the collector-emitter path of said other of said transistors.

2. A circuit as claimed in claim 1, including a source of a starting pulse connected to render one of said transistors initially conductive.

3. A circuit as claimed in claim 1, in which said load is a center-tapped winding of an inductive member, an output electrode of each of said transistors being respectively connected to the ends of said winding.

4. A push-pull inverter circuit comprising first and second terminals for receiving d-c input voltage, an inductive load member having a center-tapped winding, said center tap being connected to said first terminal, a first transistor having a collector-emitter path connected between one end of said winding and a circuit point, a second transistor having a collector-emitter path connected between the other end of said winding and said circuit point, switch means connected electrically in series between said circuit point and said second terminal, means for rendering said switch means alternately conductive and nonconductive with the conductive periods being relatively longer than the nonconductive periods, first diode means respectively connected in circuit paths between the base electrodes of said first and second transistors and said second terminal for conducting current in a direction to facilitate the forming of sequential stored charges in said transistors from flyback induced voltage pulses produced in said winding each time said switch means becomes nonconductive, and second diode means connected in circuit paths between said base electrodes and said second terminal for conducting current in a direction to facilitate removal of any residual stored charge from each of said transistors at the end of its conduction period.

5. A circuit as claimed in claim 4, in which said switch means comprises a third transistor having its collector-emitter path connected between said circuit point and said second terminal, and a source of control signal connected to the base of said third transistor.

6. A circuit as claimed in claim 5, including a fourth transistor having its collector-emitter path connected across the base-emitter path of said third transistor, and signal means connected to said fourth transistor to render it conductive when said third transistor is nonconductive thereby clamping said third transistor in the nonconductive condition.

7. A circuit as claimed in claim 6, in which said second diode means comprises first and second diodes connected in series opposition between the base electrodes of said first and second transistors, and means connecting the junction of said first and second diodes to the base of said fourth transistor.

8. A circuit as claimed in claim 7, in which the last-named means comprises a third diode.

9. A circuit as claimed in claim 4, in which said second diode means comprises first and second diodes connected in series opposition between the base electrodes of said first and second transistors, and circuit means connecting the junction of said first and second diodes to said second terminal.

10. A circuit as claimed in claim 9, in which said circuit means comprises a third diode.

11. A circuit as claimed in claim 4, including a source of a starting pulse connected to render one of said transistors initially conductive.

12. A circuit as claimed in claim 5, including a source of a starting pulse connected to render said third transistor and one of said first and second transistors initially conductive.

* * * * *